Patented June 2, 1942

2,285,302

UNITED STATES PATENT OFFICE 2,285,302

PROCESS FOR CEMENTING OIL WELLS

Gordon D. Patterson, Wilmington, Del., assignor to E. I. du Pont de Nemours & Company, Wilmington, Del., a corporation of Delaware No Drawing. Application December 18, 1939, Serial No. 309,899

4 Claims. (Cl. 166—26)

This invention relates to the transference of plastic material which is predominately solid through passageways of relatively small cross-section, and particularly to a process for improving the flow characteristics of cementitious material required to be transferred through passageways of relatively small cross-section, and more particularly to a process for introducing into oil wells concrete mixtures suitable for forming filters for petroleum, and to a composition of matter suitable for forming filters for petroleum and having improved flow characteristics.

The need for oil well filters appears to be generally recognized. Many wells being completed today are equipped with devices for straining sand from crude petroleum. The fracture of sandstone and other soft formations by drilling or by explosives intended to increase the yield of oil leaves pulverized material which may subsequently be carried out of the well if the flow of oil is rapid, and not infrequently this material, through its abrasive action, damages the well casing or other equipment. Numerous expedients have been employed for removing sand from crude oil, among which might be mentioned screens, perforated liners, and gravel packs, all of which serve as filters in the well. However, filters of porous concrete, because of their low cost, wide permeability range and absolute contact with the oil-producing formation, are now being given considerable attention.

In constructing filters of this latter type, one method is to introduce concrete into an oil well by confining the concrete in plastic state in the well casing by plugs or pistons situated above and below the charge and forcing this assembly to a predetermined depth where an opening in the casing permits discharge of the concrete.

The employment of this method for introducing porous concrete into wells requires that the concrete be sufficiently plastic or fluid to flow through the well casing. Unfortunately, concrete which is fluid when freshly mixed is not always porous when set, and concrete which is both fluid and porous may be lacking in other essential properties so that for filter purposes it is useless. Porous concrete prepared by gaseous inflation of a sand-cement-water slurry is, under some circumstances, an example of material of this type. Although pore structure will be developed if such concrete sets under the usual atmospheric pressure, the conditions of temperature which prevail in the deeper wells and the pressures under which capped wells are maintained have been found to be sufficiently high to promote collapse of the pore structure of inflated concrete during the setting period.

The type of porous concrete most satisfactory for constructing filters for petroleum is that obtained by using a major proportion of aggregate with a minor proportion of binding agent. A filter of this composition has essentially the structure and porosity of the mass of aggregate alone since the binding agent is disposed principally at the points of contact of the aggregate particles. Among the advantages of this type of filter cement are: (1) resistance to extreme pressure which would promote collapse of filter cement rendered porous by inclusion of gas bubbles, and (2) the control which may be exercised over porosity of the filter by proper choice of aggregate and proportion of aggregate to binder.

Concrete in which porosity is thus regulated by the size of aggregate and the aggregate-cement ratio employed in its production, is quite suitable for the preparation of oil-well filters in most respects, but lacks fluidity in the un-set condition. An aggregate-cement ratio high enough to give a structure consisting essentially of aggregate particles cemented to one another at their points of contact yields a rigid filter which is extremely resistant at all times to compressive forces, but the resultant concrete slurry is not amendable to transfer through steel oil-well casing. Friction between the casing and the pebbles and the opposing pressure of fluid confined within the well induces the slurry to lock in a rigid mass which can be moved only by extreme pressure.

It is an object of this invention to render concrete of high aggregate-cement ratio, i. e. concrete consisting principally of aggregate (or analogous plastic masses consisting predominantly of solid material), transferable through steel pipe or other type of passageway so that the cementing of oil wells, and especially those which are maintained under temperatures and pressures which render inflated concrete useless as a material for constructing filters, may be accomplished readily with aggregate-type of concrete mixture which is suitable for the construction of porous concrete structures such as oil-well filters, and which has improved flow characteristics. A still further object is an improvement in flow of plastic high-aggregate-types of porous concrete. These and other objects will more clearly appear in the description which follows.

These objects are achieved according to this invention by adding to the concrete mixture containing aggregates of suitable size and in suitable relative proportion for the intended purpose, sufficient inert, water-immiscible diluent liquid to fill the voids which exist naturally in porous concrete of high aggregate-cement ratio. This liquid serves as a pressure-transmitting fluid and further serves to lubricate the concrete mass, with the result that its fluidity is increased to the point where it may be transferred through a conduit or pumped into a well by application of only slightly more force than is required to overcome the opposing pressure of the fluid confined in the well. The additional fluidity imparted to aggregate-type porous concrete by inclusion of inert, water-immiscible liquid also aids materially in its placement in the cavity of the well which is to be cemented; the concrete flows into irregularities and fissures more readily than unmodified material and thereby seals off the oil-producing formation more effectively.

The invention is illustrated by the examples which follow. Parts are by weight.

The following two examples illustrate the improvement of the present invention (Example II) over the prior art practice (Example I).

*Example I*

Concrete prepared from graded aggregate (3–8 mesh and a density of about 1.55) 1000, Portland cement 125, and water 80 parts was confined in a 2" steel pipe by steel pistons equipped with rubber facings. It was found that concrete so confined exhibited extreme resistance to flow. A column only 5" in length required a pressure of from 800 to 1200 lbs./sq. in. to initiate flow downward through the pipe and movement of the column could be maintained only if a pressure of about 200 lbs./sq. in. was continually applied.

*Example II*

Graded aggregate (3–8 mesh and a density of about 1.55) 1000, Portland cement 150, and water 75 parts were mixed thoroughly. Sufficient mineral oil (about 195 parts) was then added to the concrete mass to provide a slight excess above that required to fill the interstices in the concrete. When this oil-modified concrete was tested for fluidity, a 5" column could be pumped downward through the 2" steel pipe by the application of pressures amounting to only a few pounds per square inch, substantially the pressure required to overcome the friction effect due to the steel pistons and rubber gaskets.

*Example III*

This example illustrates that the presence of oil neither interferes with setting nor reduces the strength of the concrete after setting.

Graded aggregate (3–8 mesh and a density of about 1.55) 1000, Portland cement 125, and water 76 parts were mixed until uniform. Two hundred ten parts of light mineral oil were added to this slurry, and mixing was continued until a uniform composition was obtained. The oil-modified concrete and a similar concrete which was not modified were cast in separate molds and were observed from time to time during setting. Upon standing for a short time the pebbles which had been separated by a film of oil were observed to become united at their points of contact by means of the Portland cement paste, and not only did this concrete set at the normal rate but it was comparable in strength to the unmodified material of the same composition.

*Example IV*

An oil-well in which the oil-producing cavity after shooting is roughly spherical and about five feet in diameter is cleaned by one of the usual procedures, e. g. bailing or circulation, preparatory to cementing. A column of water is maintained in the casing to prevent a blowout, and consequently it is convenient to force the porous concrete slurry into position while confined between plugs. About three tons of fresh concrete are then prepared from materials which are combined in the ratio: aggregate (3–8 mesh and a density of about 1.55) 1000, Portland cement 125, water 80, and crude oil (Saybolt Universal viscosity, 60 sec. at 25° C.) 150 parts by weight. The crude oil is not added to the mixture until the water-cement paste is uniformly distributed throughout the aggregate. The freshly prepared slurry is then charged into the casing (8" diameter) following a piston which fits the casing tightly but yet is able to move freely. When all the concrete slurry has been put into the casing, a second piston is placed in the casing following the charge and the entire assembly is pumped to the bottom of the well where the concrete is discharged. At the end of 36 hours the porous concrete plug is partially drilled out to provide a sump for receiving the petroleum which filters through. When drilling equipment is not at hand or if desired the sump may be formed by lowering a form or plug into the well and forcing it into the porous concrete while it is still in the fluid condition. After the concrete has set the form is removed. In some cases the form may be placed before the cement is introduced.

It should be understood that the method of placement which has just been described is usually preferred for introducing concrete into wells maintained under pressure because it utilizes oil-well cementing equipment which is widely available. In particular instances other methods for introducing the porous concrete into the well may be employed. The concrete can be transported through the head of water to the oil-producing cavity in a carrier or traveling bucket. The well can also be pumped dry and sealed under pressure. In this event the porous concrete can be introduced into the casing by means of an air-lock and permitted to fall freely to the bottom of the well where its flow characteristics permit uniform distribution.

*Example V*

The viscosity of the inert material may in some instances become a factor in determining how readily it is transmitted through pipes. When the flow of material is downward a less viscous diluent may be used than when the concrete is to be pumped horizontally or upward. In fact viscosity of the diluent may be varied within wider limits when the charge is to be pumped downward. When flow is desired in another direction, however, a more viscous diluent is more satisfactory. To obtain an oil of more suitable viscosity it is of advantage in certain cases to modify it with a thickening agent such as the paraffin used in the following example.

A concrete slurry prepared from 3–8 mesh gravel 1000, Portland cement 126, and water 76 parts is thoroughly mixed with 190 parts of a viscous oil obtained by thickening a light mineral oil with 10% paraffin wax. The resulting mixture of concrete and diluent not only flows downward through a pipe very readily but can be pumped horizontally or upward with about the same facility.

It is to be understood that the above examples are for purposes of illustration only and that in the matter of proportions and materials the invention is susceptible to wide variation, particularly as follows.

The classification "aggregate" is considered to include all types of solid inert materials which might be included in a filter structure to furnish bulk and to produce voids by its inability to form a solid structure. Among the commonly available substances which are quite useful in this respect are crushed stone, coke, gravel, furnace cinder, pumice, marble chips, and blast furnace slag, although other materials may be used. For most purposes particles retained by a No. 8 sieve, i. e. particles not less than about $\frac{1}{16}$ inch in diameter (or greatest dimension) are more suitable for production of filters of permeability greater than 20 darcies. There is no upper limit at which aggregate becomes unusable except that it must be small enough to pass through the steel pipe which will conduct the filter material.

Portland, or other hydraulic cement, because of its cheapness and availability, is used as a preferred binding agent, but other inorganic cements such as plaster of Paris, slaked lime mortar, magnesium oxychloride cement, puozolanic cement, or aluminous cement can be used also. We prefer to use inorganic binding agents in most cases because of their lower cost and relative indifference to water or crude oil in oil wells. Organic binding agents such as thermoplastic resins, latex, viscose, urea-formaldehyde resin, alkyl resin, neoprene latex, or organic solutions of film-forming materials such as nitrocellulose or cellulose acetate may be used; however, treatment of the binding medium with a suitable coagulant after the filter medium has been placed in position may be required with certain of these binding agents. The ratio of binding agent to aggregate will depend upon the degree of permeability desired of the filter and upon the degree of fineness of the aggregate, but it is to be noted that any size of aggregate and any ratio of aggregate to binder may be used in the practice of this invention, provided the mixture is such as to produce a concrete structure of the desired porosity and strength on setting. To state the matter more concretely, it may be said that any mixture may be used with advantage in the process of this invention provided the said mixture is capable of setting up to produce a filter of permeability greater than 20 darcies, which permeability is in general attained using aggregate sized from about $\frac{1}{16}''$ to about $\frac{1}{2}''$ and aggregate-cement volume ratios within the range of from about 3 to about 20, and preferably from about 5 to about 10.

The nature of the diluent fluid is not critical except for the restriction that it be immiscible with the binding agent solution or suspension and that it be chemically inert in presence of the binding agent phase. If the binding agent is of the aqueous type such as Portland cement or a cement like plaster of Paris, the pressure transmitting fluid may be a petroleum-type product such as crude or partially refined petroleum, or a product of the refinement of petroleum such as gasoline, kerosene, petrolatum, mineral oil, or mixtures of any or all of these with each other or with paraffin wax. If desired, however, other immiscible organic liquids or low melting solids may be used for the same purpose. Among such compounds are vegetable oils, fish and other animal oils, and chlorinated hydrocarbons. If, on the other hand, an organic material is to be used as the binding agent, the diluent fluid selected in any given case will depend on the physical state of the binder. For example, if water solutions of viscose or urea-formaldehyde resin are used, water-immiscible oils or organic liquids of the type mentioned above may be used as diluents, while water may be used as the pressure-transmitting fluid if cellulose acetate or nitrocellulose or a synthetic resin in organic solvent is used as the binding agent.

The amount of diluent fluid which is added is not critical providing enough is used to fill the pores existing in the mass of aggregate and binder. The mixture will not have the desired fluidity unless the minimum limit is observed. In practice the minimum requirement of diluent is readily ascertained by adding it to the mass of aggregate and binder in a suitable container such as a concrete mixer. The pore-filling diluent flows into the mass readily until the interstices have been filled and then will appear as a layer covering the mass as excess diluent is added. It is not necessary to add diluent beyond this point.

This invention provides a process whereby the porous type of concrete most suitable for use in constructing oil well filters, namely, the high aggregate-cement ratio type of concrete, may be easily introduced into the well cavity without injury to the well casing and without requiring special apparatus in addition to that at present used for introducing non-porous concrete into oil wells. It also provides a means for similarly handling and placing concrete of this type wherever needed for structural or other purposes.

The invention is not limited to the specific embodiments herein disclosed, it being understood that all obvious variations and equivalents falling within the spirit of the invention are to be included within the scope thereof as defined by the following claims.

I claim:

1. A process for improving the flow characteristics of a porous concrete mixture comprising a major portion of aggregate and a minor proportion of binding agent without increasing its porosity which comprises adding as a constituent of the concrete mixture, without stable emulsification, an inert liquid, which is immiscible with the binding agent, in an amount not less than that required to fill the voids existing in said concrete mixture.

2. A process for improving the flow characteristics without increasing the porosity of a porous concrete mixture comprising aggregate, water, and Portland cement in proportion to set up to a porous mass of permeability greater than 20 darcies, which comprises adding to said mixture, without stable emulsification, a petroleum-type liquid in an amount not less than that required to fill the voids existing in said concrete mixture.

3. In the process of forming a concrete filter in an oil well cavity wherein an un-set concrete composition comprising a major amount of aggregate and a minor amount of binding agent is passed down the oil-well casing into the oil-well cavity and is then allowed to set, the step which comprises adding as a constituent of the concrete composition which is to be passed down the casing, without stable emulsification, an inert liquid material which is immiscible with the binding agent in an amount not less than that required to fill the voids in said concrete composition, whereby the said concrete is made to flow more easily without increasing its porosity.

4. In the process for introducing a plastic mass comprising a major proportion of aggregate and a minor proportion of Portland cement slurry into an oil well, wherein said plastic mass is disposed between movable pistons in an oil well casing and pressure is exerted on the uppermost piston to force the plastic mass down to the desired point in the well, the improvement which comprises adding as a constituent of said plastic mass, without stable emulsification, an inert liquid which is immiscible with the binding agent and which is present in an amount not less than that required to fill the voids existing in said plastic mass.

GORDON D. PATTERSON.